United States Patent
Wen et al.

(10) Patent No.: US 6,579,176 B2
(45) Date of Patent: Jun. 17, 2003

(54) COMPUTER-BASED GROWING SIMULATION METHOD AND SYSTEM

(75) Inventors: Shih-I Wen, Taipei (TW); Hao Shih, Nanjing (CN); Hai Hsian, Nanjing (CN); Chien-Jen Huang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/887,339

(22) Filed: Jun. 25, 2001

(65) Prior Publication Data

US 2002/0198033 A1 Dec. 26, 2002

(51) Int. Cl.[7] .......... A63F 13/00; A63F 9/24; G06F 17/00; G06F 19/00
(52) U.S. Cl. .......... 463/9; 463/23
(58) Field of Search .......... 463/9, 23, 7; 434/322, 434/323; 273/429

(56) References Cited

U.S. PATENT DOCUMENTS

| | | |
|---|---|---|
| 5,604,855 A | 2/1997 | Crawford |
| 6,142,472 A * | 11/2000 | Kliebisch .......... 273/236 |
| 6,368,111 B2 * | 4/2002 | Legarda .......... 434/236 |

* cited by examiner

Primary Examiner—Denise L. Esquivel
Assistant Examiner—Marc Norman
(74) Attorney, Agent, or Firm—Birch, Stewart, Kolasch & Birch, LLP

(57) ABSTRACT

A computer-based growing simulation method and system is adaptable for a game and particularly a role playing game that reflects the growth of a selected role. In the game, the system will generate many different events such as simulated environments. Each simulated environment includes simulated lifelike objects (such as views or things) and conditions or selection items for the role to behave. Each condition or selection item links or relates to a selected object. The growth journeys are shown through the role's progress in the game. The game does not progress in a fixed path or rounds format, but is determined by the behavior of the role in the game. The role's growth status is indicated by a set of corresponding parameter groups. The parameter groups will change and accumulate according to the role's growth journey. Variations of the parameter groups will reflect the player's growth journey and feelings in the real world. The invention offers diversified game content to allow players to have lifelike participation experiences.

14 Claims, 4 Drawing Sheets

US 6,579,176 B2

COMPUTER-BASED GROWING SIMULATION METHOD AND SYSTEM

FIELD OF THE INVENTION

The invention relates to a computer-based growing simulation method and system, and particularly a computer role-playing game that progresses not in a fixed path, but has diversified game content to allow players to experience real world growing journeys and feelings through role-play, and have lifelike participation.

BACKGROUND OF THE INVENTION

Most known role-playing games now available on the market proceed and progress through the players maneuvering in the roles provided by the games. The object of the games is usually to accomplish a specific mission, or to overcome different obstacles, barriers or stages. The motif and nature of the games generally include the following categories:

(a). "fighting type" games to test players' reflexes and knowledge of the rules of the game;

(b). "exploration type" games to motivate players to take adventurous journeys and explore different places; and (c). "simulation type" games such as battle simulations to allow players to explore many different places and test the players' ability to operate simulation tools (such as vehicles) or other equipment.

The games developed in the past mainly proceed through a number of rounds, or according a storyline. For instance, U.S. Pat. No. 5,604,855 discloses "Computer story generation system and method using network of re-usable substories". It includes many defined characters to allow players to choose freely. Each character has a personality profile. The game proceeds and unfolds according to a storyline and substories, which have a series of events involving interaction between fictional characters. The story and event evolutions are provided by the system. It employs an artificial intelligence design, and uses interactive properties to appeal to the game players. While it may initially pique people's interest, it becomes boring after the players play for a period of time. As the players have to follow established steps to accomplish the missions, the results are predictable and repetitive. It may have enough interaction, but there is not much participation.

SUMMARY OF THE INVENTION

The primary object of the invention is to provide a computer-based growing simulation method and system that is presented in an image game fashion, as a role playing game, to allow players to participate and experience the progression and feelings of a real world growing process.

In the method of the invention, the system provides many different events during the growth process of the roles, including simulated environments. Each simulated environment has simulated real environment "objects" (such as views or things), and conditions or selection items for the roles to behave or act. The conditions or selection items further connect or relate to a certain object. Growing journeys and feelings are shown according to the progression of the roles in the game. The growth status of the roles is indicated by a set of corresponding parameters (such as charisma, intelligence, morality, physical strength, money etc.). These parameters will change and accumulate during the growth process. The changes of the parameters reflect the players' real world growth process and feeling, and provide a lifelike participation experience.

Another object of the invention is to provide a role-playing game that does not evolve along fixed paths during the process and does not proceed in the role-playing by rounds (barriers or levels) format. The invention is based on games developed in the past and offers players a virtual growing environment. Players use selection methods to determine the progress of the game, cause changes of the various parameters, and achieve different results.

To attain the foregoing objects, in the method of the invention, the system will generate many different events, including simulated environments. Each simulated environment has simulated real environment objects (such as views or things), and the conditions or selection items for the roles to behave. A condition or selection item further links to an object or relates to another object. The game progresses not in a fixed path or rounds format, but depends on the behavior or actions taken by the roles in the game. Hence, the journey of the game may proceed according to the player's free will, and may reach unpredictable endings.

The foregoing, as well as additional objects, features and advantages of the invention will be more readily apparent from the following detailed description, which proceeds with reference to the accompanying drawings.

BRIEF DESCRIPTION OF THE DRAWINGS

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
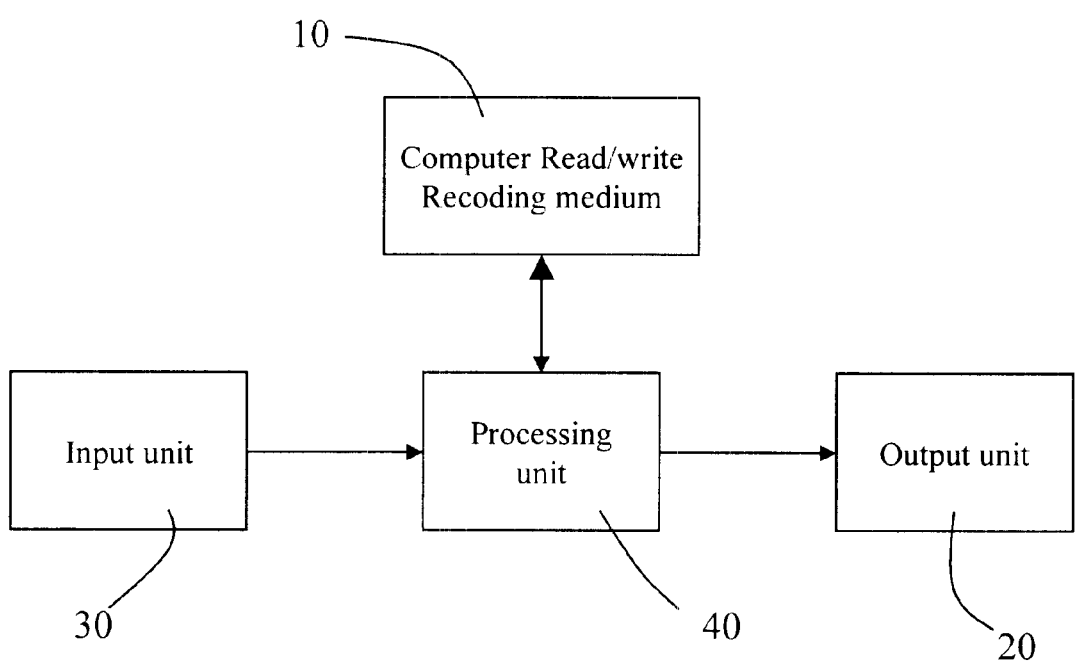
FIG. 1 is a block diagram of the system hardware architecture of the invention.

Referring to FIG. 1, the method of the invention is carried out on a computer system consisting of:

a recording medium 10, especially a recording medium allowing the computer to read and write for retrieving and storing data during the game (such as programs, commands, parameters or historical files of the game's journeys). This could be memory (including read only and read/write memory), read/write hard disk drives, floppy disk drives, magnetic tape drives, optical disk drives, etc.;

an output unit 20 to send messages during the game, which may be a screen, display device or projector that can display visual signals (such as images), or speakers for generating audio output;

an input unit 30 to allow players to control the game, such as by entering commands or parameters. The input unit 30 may be a keyboard, joystick, light pen or touch screen, or a combination of these devices; and a processing unit 40 to execute programs (commands) stored in the recording medium 10, which may be a microprocessor unit (MPU) or a computer.

The recording medium 10 stores the following data:

a role library, including:

the image data of many different roles, which may be presented in a visual image format through the output unit 20; and basic parameter groups corresponding to every role. The parameter groups include at least an age parameter for any role in the game (such as charisma parameters, intelligence parameters, morality parameters, physical strength parameters, money parameters, etc.);

an event library, including:

a plurality of image data for different simulated environments, including "objects" for simulated real environments (such as views or things), which may be presented as a visual image through the output unit 20; and selection item groups for the roles to behave accordingly, including one or more selection options. Every selection item is related to a certain event in the event library or the simulated environment. When a selection item is triggered (selected), the corresponding event will be executed or the main basic parameter values of the roles will be changed;

relation recording table, for recording the relationship between every role and event. For instance, the basic parameter relationship between a selection item and a role, or the relationship between a selection item and an event; and a command macro (or cluster) for instructing the processing unit 40.

The growing simulation method according to the invention proceeds in a game format, particularly as an image game that combines video and audio effects. The game evolves by using the data stored in the recording medium 10, and ordering the processing unit 40 to execute, coupled with the operation of the input unit 30 (such as keyboard, mouse, etc.). The game is presented in a realistic picture image format on the output unit 20 (such as a display screen). The recording medium 10 also provides executable object codes to the processing unit 10 for executing the following steps:

a. providing a role library, including:

the data of many different roles, which may be presented in a visual image format through the output unit 20; and basic parameter groups corresponding to every role. The parameter groups include at least an age parameter for any role in the game (such as charisma parameters, intelligence parameters, morality parameters, physical strength parameters, money parameters, etc.);

b. providing an event library, including:

a plurality of different simulated environments, including "objects" (such as views or things) for the simulated real environments, which may be presented as visual images through the output unit 20; and selection item groups for the roles to behave accordingly. Every selection item is related to an event in the event library or a simulated environment. When a selection item is triggered (selected), the corresponding event will be executed or the main basic parameter values of the roles will be changed;

c. providing a relation recording table for recording the relationship between every role and event, such as the basic parameter relationship between a selection item and a role, or the relationship between a selection item and an event;

d. displaying visualized roles and events on the output unit 20 (such as images of views and things, or frames of the selection item);

e. receiving signals or commands entered by the players through the input unit 30 to change the behavior of the roles or trigger certain events (such as choosing a selection item); and f. using the processing unit 40 to process the corresponding events, and sending the processed results in a visualized format to the output unit 20.

During step a, each role may grow in the simulated real world through the maneuvering of the player. Every role will generate a behavior (such as choosing one of the selection items provided by the system, or triggering an event) with the signals or commands generated by the devices operated by the player. The behavior takes place continuously according to the age parameters of the role, accompanying the set parameter groups corresponding to any role (such as charisma parameters, intelligence parameters, morality parameters, physical strength parameters, money parameters, etc.) to represent the characteristics of the role and the growth status at any specific time. The characteristic parameter groups also will be changed constantly and continuously according to the behavior of the role. In other words, the behavior of the role will directly affect the values of the parameter groups. Hence, the variation of the parameter groups values will reflect the growth journey and feelings of the players in the real world, thereby providing a realistic participation experience.

In step b, although the selection items are related to a certain simulated environment in the event library, the relationship is limited to responding to the event triggered by the role. For instance, a new simulated environment will open to show that the role has entered another environment or game world, or choose a selection item to pull out a dialogue frame, and the basic parameter values of the role will change corresponding to the selected item. The important feature is that the events do not take place according to a constant sequence, difficulty degrees or rounds sequences. The player plays the game in a simulated environment filled with many different parameters. Events happen based solely upon the behavior of the role, such as making a selection, or initiating a relational event. Hence, the system allows the players to use a selection method to determine the progress of the game, and to trigger changes of various parameters and achieve different game results.

Figure 2:
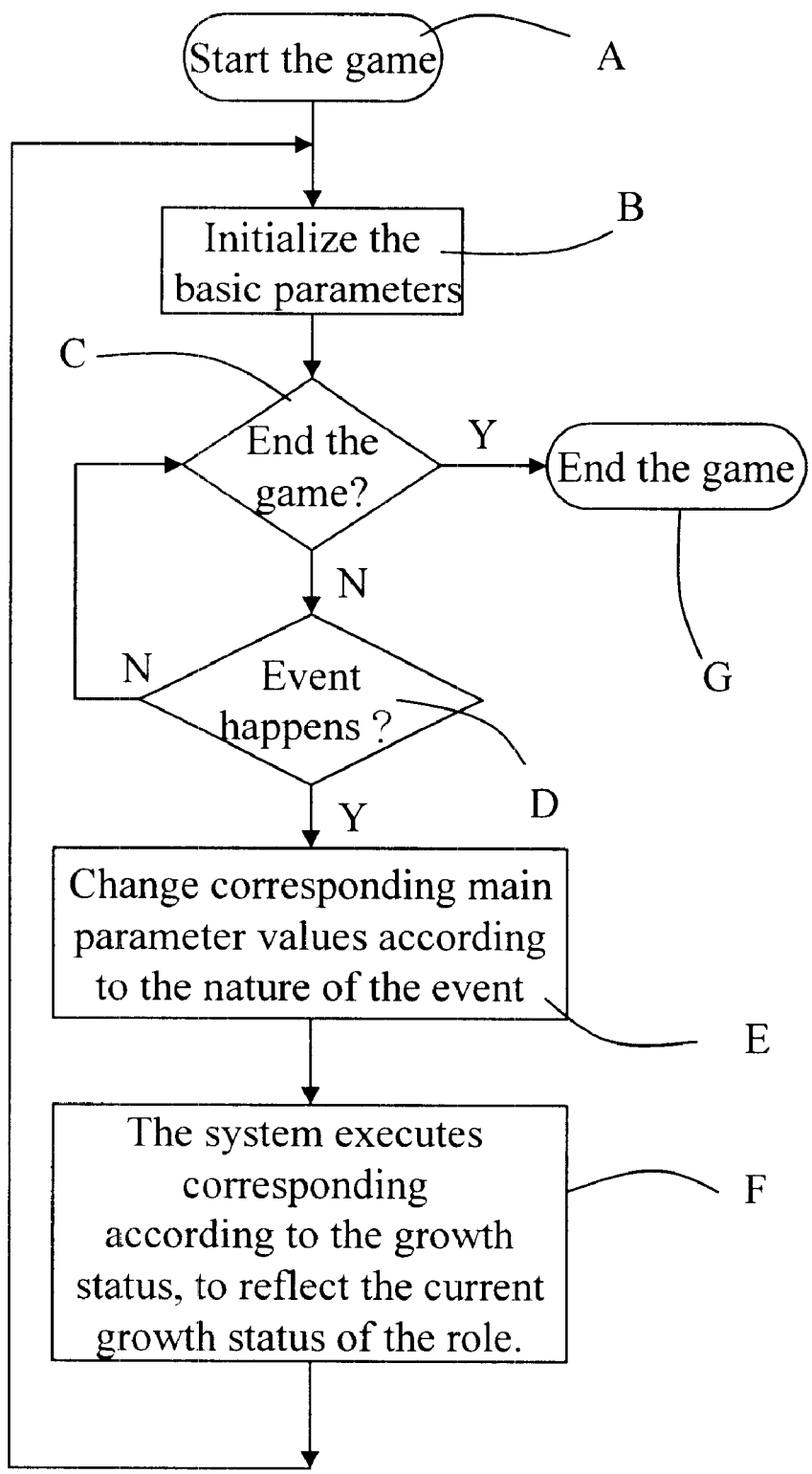
FIG. 2 is the system flow chart of a first embodiment of the invention.

FIG. 2 shows a first embodiment of the process flow of the invention implemented on the computer 40. The process includes the following steps:

A. Starting the game;

B. Initializing the basic parameters;

Give a preset initial value to the basic parameters of every role, for instance, the initial parameter value is 30 points for each of the charisma parameter, intelligence parameter, morality parameter, physical strength parameter, money parameter, etc. (of course, the initial values may be not the same for all, or may be totally different. The present invention also does not exclude the possibility of allowing the players to set their own initial values), and age parameter is 7 years old;

C. Determining if the game is over or pause (temporarily stop), if positive, branch to the step G; if negative, proceed the next step;

(During the game, it could happen that the result of a certain event will cause the game to end, or the players may decide to end the game).

D. Judging if an event happens, if positive, proceed the next step; if negative, branch to the step C;

(During the game, the behavior of the role may evoke or trigger a certain event, such as the system will provide a selection item for the role to choose);

E. Changing the corresponding main parameter value according to the nature of the event;

(As the behavior of the role will result in some decision or consequence, once a selection item is chosen, the system will change the related basic parameters according to the changed contents of the selected item, or trigger another event);

F. The system executes corresponding processes according to the growing status (i.e. analyzing the role's current basic parameter values) to reflect the role's growing status; and (at this step, the system mainly analyzes the role's current growing status. As the system has divided the growing stage of people in several big modular blocks, such as juvenile period, puberty, or mature period. The puberty further may be divided into several time frames. The event library stores the events corresponding to different growing stages. Each growing stage has suitable events. The system will evoke corresponding events according to the age of the role, namely will provide the most realistic environments and views to match the growth of the role. Hence the player will keenly feel the growing experiences all the time, and the system will judge if the role's basic parameters meeting the advance standards preset in the system and determine the proper treatments to the role, such as promotion, demotion, advance stage, etc. Details and examples will be elaborated as follows);

G. End the game.

Figure 3:
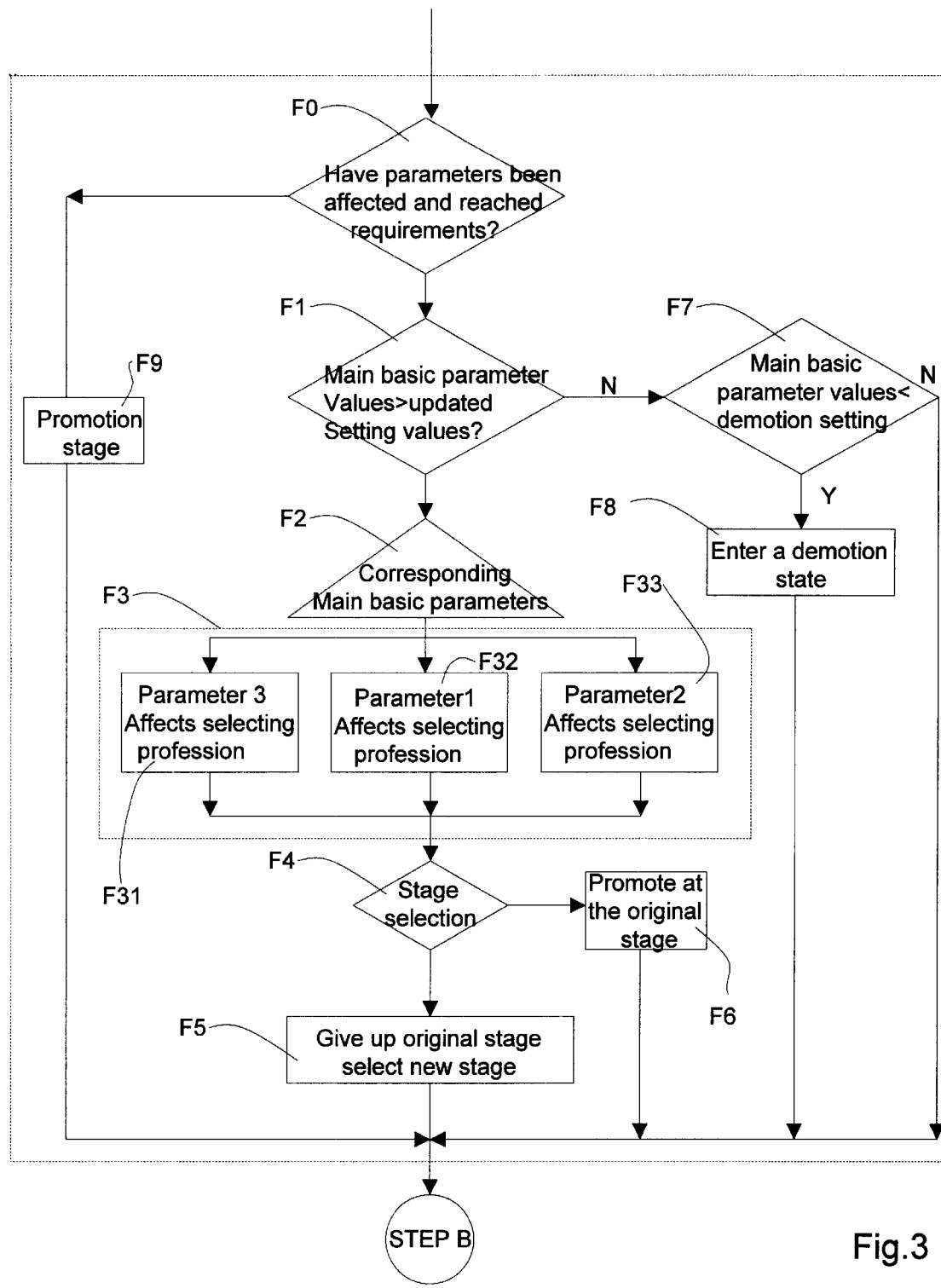
FIG. 3 is a portion of the process flow of FIG. 2.

The step F further includes the following steps (refer to FIG. 3):

F0: Judging if multiple numbers of parameters are affected and simultaneously reach the requirements preset by the system (such as reach the standards of promotion for one level in the currently growing modular block), if positive, branch to the step F9; if negative, proceed to the next step;

F1: Judging if the corresponding main basic parameter values are greater than the updated setting values (such as whether the age parameter reaches the standards of the next growing modular block), if positive, proceed to the next step; if negative branch to the step F7;

F2: Retrieving the corresponding main basic parameters;

For instance: when the role's age parameter has reached the growing modular block of the mature period, the role will be in the time of choosing profession. The system will provide a profession selection item for the player to choose from. After the player chooses a profession, the player may retrieve the corresponding main basic parameters and to couple with the steps F31, F32, F33 for the corresponding processing;

F3: Performing a further corresponding process based on the retrieved main basic parameters; such as: a number of parallel steps F31, F32, F33 represent respectively relationship between a certain basic parameter and the corresponding profession, namely after the player chooses a profession, the system will retrieve the main basic parameters corresponding to the profession for further processes;

F4: Based on the retrieved main basic parameters providing the player selection items for self-determine stage, including: selection items select for giving up the original stage and changing to a new stage (such as give up the employed stage, change to a self-employed stage), and selection items of promotion at the original stage (such as promote from an employee to an executive in the same profession). If the selection is the former one, proceed the next stage; if the selection is the later one, branch to the step F6;

F5: Giving up the original stage and changing to a new stage, then branch to the step B; (for instance, give up the employed stage, change to a self-employed stage, the system will change the role's profession records, and update the corresponding main basic parameters at the step B [such as, when choosing self-employed, the "money" value in the main basic parameters will decrease]);

F6: Promoting from the original stage, and branch to the step B;

(for instance, promote from an employee to an executive in the same profession, the system will change the role's profession records, and at the step B, update the corresponding main basic parameters [such as promoted to executive, the "intelligence" value in the main basic parameters will increase]);

F7: Judging if the corresponding main basic parameter values are smaller than demotion level, if positive, proceed the next step; if negative, branch to the step B;

F8: Entering a demotion state, then branch to the step B; and (the system will constantly execute the demotion process when the main basic parameters do not reach the standards)

F9: Promoting the stage, then branch to the step B.

It is to be noted, in this system, not all the main basic parameters can directly affect the leading role of the game. There are weighting factors. In the design of the events, the reflecting nature of the events has been used to define a specific corresponding parameter as the main parameter which will affect the result of the event. The result of the event will also be used to change that parameter. The increase or decrease of that parameter will affect the future progress of role's life.

The promotion or demotion in this game is processed as follows: The design of every promotion stage has fixed parameter requirements as basis. For instance, morality needs 100 points, charisma needs 200 points, and the like. The system will constantly judge the role's various parameters values and determine if the role has reached the standards. If reaching the standard, promotion will be completed any time at a free choice box, and a rich special effect of congratulation will be presented through the output unit 20 to the player. In the mean time, the system will also constantly calculate if the role's various parameters have fallen to the demotion requirements. For instance, if the morality is lower than 20, the system will give the role a highlight of the deficiency or failure of that parameter, and gives the role a demotion treatment. The demotion may also be accompanied with a special effect and presented to the player through the output unit 20.

Taking the role's growing journey reaching the mature period as an example, all the basic parameters which the role has accumulated in the preceding periods will have vital influences, as the role has started social life and has to select a profession. The profession selection is done by the role, but will be determined by whether the corresponding basic parameters values of the profession have met the requirements. When the player chooses a certain profession, there are always one or more basic parameter values that have a relationship with that profession. More specifically, when the player chooses a profession, the system will take the current value of a certain basic parameter or a number of basic parameters as the basis to judge whether the role is allowed to choose that profession. When the role tries to choose any profession, the system will automatically judge if the role's current value of a certain basic parameter or a number of parameters have reached a preset standard. Only when the standard is reached, will the system allow the role to choose that profession. Otherwise, the system will reject the role from choosing such a profession as a career of life. The role has to choose other matching professions, or continues receiving growing tests to accumulate sufficient basic parameter values. Hence, the role will face the challenges of choosing the path of life because of his/her own choices in the past. Thus, it is like the actual happenings in the real world and gives the players realistic experiences of growing situations.

Furthermore, the role's growing progress is not always smooth and straightforward. An unfortunate ending might happen because of some triggered events. The system also will set up some monsters which will appear randomly during the role's growing journeys to hinder the role's growth. In the battles against the monsters, the role could win or lose and result in change of parameters, and may also affect the life in the future. Hence the role's selections in the battles are also important.

The following is an embodiment example adapted for the Monopoly board game. The roles of the game have five main parameter values, i.e. morality, intelligence, charisma, physical strength, and money. Each parameter has a constant initial value. In the game, the system may generate a series of events to allow the game progressing.

EXAMPLE 1

The Leading Role Passes a River Side and Sees a Girl Struggling in the Water, at this Moment, Two Selection Items Appeared 1. Bravely Saves the Girl
2. Ignores and Does Nothing Each selection item will have a corresponding parameters affected. For instance, choose the option 1, the result will be: the girl being saved will be grateful. And two basic parameters will be changed: physical strength and morality. The parameters value of the physical strength will decrease because of giving saving efforts. However, when setting the parameters, the morality parameter value is the main selection parameter. Hence although the parameter value of the physical strength might have a minor suffering, the morality parameter value will have a great boost. As a result, the negative impact of the physical strength will become negligible. Choosing the option 2 will also incur a parameter change, i.e. the morality parameter value. Because of not saving the girl, the morality parameter value will drop. As the morality parameter is the main parameter of this selection item, the dropping magnitude will be huge. As a result, the leading role of the game will suffer.

It is to be noted, the provided selections are corresponding to realistic situations. Any selection reflects the role's attitude of handling events that might actually happen in the real life. If the role makes the selection seriously, the selection will reflect the role's attitude when encountering such an event. This confirms what has been mentioned before, the changes of the parameters will indicate the current status, and further reflect the player's growing journeys and feelings in the real world. It also offers diversified game contents and realistic participation experiences.

EXAMPLE 2

The Role of the Game at Home Decides to Join an Art Training, with Two Choices

1. Join Dance Training
2. Join Art Learning

Whatever the selection, the main impacted basic parameter is the parameter value of charisma. The reasoning for such a situation is that different selection items could lead to the same goal. However, such a selection is not totally meaningless, as it will have certain relationship with the role's profession in the future. At the profession selection stage, the role may have a lot of selection choices. If the role chooses the option 1, his/her chance of becoming an entertainer is greater. As the system will judge if he/she has that skill in the past. If the role chooses to be an "artist", the system will judge if the role has chosen the option 2 for the art learning in the past. These records are accessible in the relational record table.

EXAMPLE 3

When the Role Enters the Simulated Environments of the Profession Map, the System will Provide a Number Profession Selection Items.

At that time, the contents of the selection items are automatically determined by the system based on the role's accumulated basic parameters in the past, and fetched from the event library.

For instance, if the role of the game chooses the profession of "doctor", the relational main parameter for this profession is the morality parameter. When the system judges the growing journeys in the past, the role has been proceeded in a passive mentality, and if the accumulated morality parameter cannot meet the setting minimum requirements, the role will not be allowed to choose the profession of the doctor. At this juncture, the morality parameter has a decisive effect. Other professions will also have corresponding parameter requirements. Even with the same parameter requirements, different professions will have different parameters value requirements.

Figure 4:
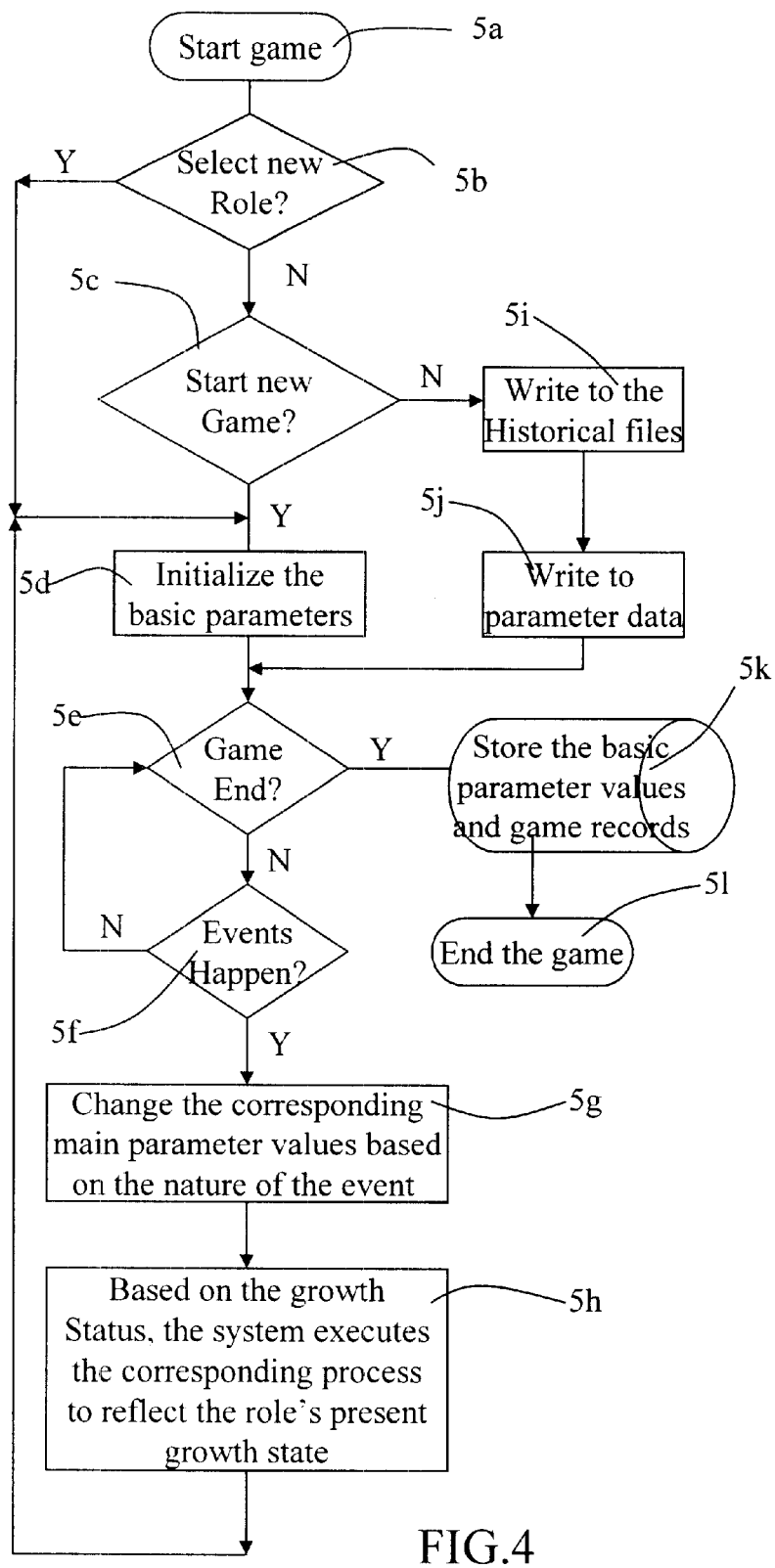
FIG. 4 is the system flow chart of a second embodiment of the invention.

Referring to FIG. 4 for the system flow of a second embodiment of the present invention, it is a variation based on the FIG. 2, and includes:

5a. Start the game;

5b. Check if the role selected by the player is new, if positive, branch to the step 5d; if negative, proceed the next step;

5c. The player selects if to start a new game, if positive, proceed the next step; if negative, branch to the step 5i;

5d. Initialize the basic parameters;

5e. Determine if the game is over or pause (temporarily stop), if positive, branch to the step 5k; if negative, proceed the next step;

5f. Determine if events happens. If positive, proceed the next step; if negative, branch to the step 5e;

5g. Based on the event nature, change the corresponding main parameter values;

5h. The system bases on the growing status (i.e. analyzes the role's current basic parameter values) to execute the corresponding processes to reflect the role's present growing state, then branch to the step 5d;

5i. Write to the selected role's historical files;

5j. Write to the selected role's previous basic parameter data, then branch to the step 5e;

5k. Store the basic parameter values and game records; and

5l. End the game.

The procedures set forth above show that players may pause the game whenever they like. The system will store all the historical records of the game in the recording medium 10 so that when the players restart the game next time, they can continue the unfinished game. Of course, the players may also freely select a role who already has historical records and start a new game process. To the people who are skilled in the art, these variations are not difficult to accomplish.

In summary, this invention may achieve the following results:

1. The progress (development) of the game does not proceed in a fixed path or rounds format, but is determined through the behaviors of the roles in the game. Different behaviors will lead to different endings and growing developments. Hence it offers a rich and versatile role playing game, and may prevent the dull feeling of unchanged routines happened to the conventional role playing games.

2. The present invention is a computer-based simulation and may reflect players intimate feeling of the growing progresses, or through the computer simulated environments the players can understand different growing experiences. The invention thus offers more versatile game contents and lifelike participation.

While the preferred embodiments of the invention have been set forth for the purpose of disclosure, modifications of the disclosed embodiments of the invention as well as other embodiment thereof may occur to those skilled in the art. Accordingly, the appended claims are intended to cover all embodiments which do not depart from the spirit and scope of the invention.

What is claimed is:

1. A computer-based growing simulation method for a role playing game implemented on a computer having a read and write recording medium for storing data executable by the computer, an output unit linked to the computer and an input unit linked to the computer to complete the game by executing the following steps:

a. providing a role library which includes:
   data of plurality of different roles that are presentable in visual picture images on the output unit; and
   basic parameter groups corresponding to every role, the parameter groups including at least one parameter, and an age parameter for every role in the game;

b. providing an event library which includes:
   data of a plurality of different simulated environments including simulated lifelike environment objects and things which are presentable in visual picture images on the output unit; and
   selection item groups for any one of the roles to show behaviors accordingly including at least one selection item, any selection item being related to a selected event in the event library, wherein triggering (selecting) a selection item will cause the computer to change a role's basic parameter value in the corresponding event;

c. providing a relation recording table for recording the relationship between every role and the events;

d. displaying in a visualized fashion the role and the role's behaviors corresponding to the events on the output unit;

e. receiving signals or commands of devices operated by players through the input unit for changing the role's behaviors or triggering a selected preceding event; and f. processing the corresponding events through the processing unit and sending processing results in visualized formats to the output unit.

2. The method of claim 1, wherein the basic parameter groups include a charisma parameter, an intelligence parameter, a morality parameter, a physical strength parameter, and a money parameter.

3. The method of claim 1, wherein the age parameter represents different growing stages including juvenile period, puberty and mature period, each said growing stage further including a plurality of different time periods.

4. The method of claim 3, additionally including event data corresponding to the different growing stages.

5. The method of claim 1, wherein the computer sequentially executes the following steps:

A. starting the game;

B. initializing the basic parameter;

C. determining if the game is over or temporarily stopped, if positive, branching to the step G, below; if negative, proceeding to the next step;

D. determining if the even happens; if positive, proceeding to the next step; if negative, branching to the step C;

E. changing a corresponding main parameter value according to nature of the event;

F. executing corresponding process according to a growing status which includes a role's current basic parameter values; and G. ending the game.

6. The method claim 5, wherein the step F further includes:

F0. judging if having multiple parameters simultaneously reaching the requirements preset by the system; if positive, branching to the step F9; if negative, proceeding to the next step;

F1. judging if the corresponding main basic parameter values are greater than the updated setting values; if positive, proceeding to the next step; if negative, branching to the step F7;

F2. retrieving a corresponding main basic parameter;

F3. performing a further corresponding process based on retrieved main basic parameters;

F4. basing on the retrieved main basic parameters to provide the players selection items for self-determining stage, including: a selection item of giving up an original stage and changing to a new stage, and a selection item of promotion at the original stage; proceeding to the next stage if the selection is the former one, and branching to the step F6 if the selection is the later one;

F5. giving up the original stage and changing to a new stage, and then branching to the step B;

F6. promoting from the original stage, and branching to the step B;

F7. judging if the corresponding main basic parameter value hr smaller than demotion level, if positive, proceeding the next step; if negative branching to the step B;

F8. entering a demotion state, then branching to the step B; and

F9. promoting stage, then branching to the step B.

7. A computer-based growing simulation system employing a role playing game to simulate player's real life growing journeys, comprising;
- a recording medium readable and writable by computers for storing and retrieving required data when playing the game;
- an output unit for outputting messages in visualized formats during the game;
- an input unit for the players to control the progress of the game; and
- a computer for processing the game based on the date stored in the recording medium
- wherein the recording medium store:
  - a role library which includes:
    - image data of a plurality of different roles; and
    - basic parameters groups corresponding to every role including one or more basic parameter, the basic parameter groups including at least an age parameter for any one of the roles in the game;
  - an event library which includes:
    - a plurality of different image data for simulated environments; and
    - selection item groups for the roles to perform behaviors including at least one selection item, any selection item being related to a selected event in the event library, wherein triggering (selecting) a selection item will cause execution of a corresponding event or changing of the role's corresponding basic parameter value;
  - a relation recording table for recording the relationship between every role and event while playing the game; and
  - a command macro for ordering the computer to operate.

8. The computer-based growing simulation system of claim 7, wherein the basic parameter groups including a charisma parameter, an intelligence parameter, a morality parameter, a physical strength parameter, and a money parameter.

9. The computer-based growing simulation system of claim 7, wherein the age parameter represents different growing stages including juvenile period, puberty and mature period, each said growing stage further including a plurality of different time periods.

10. The computer-based growing simulation system of claim 9, additionally including event data corresponding to the different growing stages.

11. A recording medium readable and writable by computers for ordering a computer to execute a growing simulation game, the medium storing:
- a role library which includes:
  - image data of a plurality of different roles; and
  - basic parameters groups corresponding to every role including one or more basic parameter, the basic parameter groups including at least an age parameter for any one of the roles in the game;
- an event library which includes:
  - a plurality of image data for different simulated environments; and
  - selection item groups for the roles to perform behaviors including at least one selection item, any selection item being related to a selected event in the event library, wherein triggering (selecting) a selection item will cause execution of a corresponding event or changing of a role's corresponding basic parameter value;
- a relation recording table for recording the relationship between every role and the event; and
- a command macro for ordering the computer to operate.

12. The recording medium of claim 11, wherein the basic parameter groups include a charisma parameter, an intelligence parameter, a morality parameter, a physical strength parameter, and a money parameter.

13. The recording medium of claim 11, wherein the age parameter represents different growing stages including juvenile period, puberty and mature period, each said growing stage further including a plurality of different time periods.

14. The recording medium of claim 13, additionally including event data corresponding to the different growing stages.

* * * * *